(12) United States Patent
Chen

(10) Patent No.: US 9,955,334 B2
(45) Date of Patent: Apr. 24, 2018

(54) METHOD OF PERFORMING PROXIMITY DISCOVERY FOR NETWORK ENTITY AND USER EQUIPMENT

(71) Applicant: Acer Incorporated, New Taipei (TW)

(72) Inventor: Pei-Jung Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 168 days.

(21) Appl. No.: 14/848,352

(22) Filed: Sep. 9, 2015

(65) Prior Publication Data

US 2016/0205532 A1 Jul. 14, 2016

Related U.S. Application Data

(60) Provisional application No. 62/101,373, filed on Jan. 9, 2015.

(51) Int. Cl.
*H04W 8/00* (2009.01)
*H04W 4/00* (2018.01)
*H04W 48/16* (2009.01)

(52) U.S. Cl.
CPC ............ *H04W 8/005* (2013.01); *H04W 4/005* (2013.01); *H04W 8/00* (2013.01); *H04W 48/16* (2013.01)

(58) Field of Classification Search
None
See application file for complete search history.

(56) References Cited

U.S. PATENT DOCUMENTS

| 2014/0056220 | A1   | 2/2014  | Poitau et al. |
| 2014/0130137 | A1   | 5/2014  | Baek et al. |
| 2014/0344578 | A1 * | 11/2014 | Kim .................... H04L 63/0428 713/168 |

OTHER PUBLICATIONS

"3rd Generation Partnership Project: Technical Specification Group Services and System Aspects; Proximity-based services (ProSe); Stage 2 (Release 12)", 3GPP Draft; TS233.03, v12.1.0 (Jun. 2014),Retrieved from the Internet: URL:http://www.3gpp.org/ftp/tsg_sa/WG2_Arch/Latest_SA2_Specs/DRAFT_INTERIM/[retrieved on Jun. 20, 2014].

Broadcom Corporation: "Correction to use of masks and filters", 3GPP Draft; S2-141192 Masks et al., 3rd Generation Partnership Project (3GPP) , 3GPP Draft; 23.303 CR0042 rev—Current version: 12.0.0 (Jun. 2014), Retrieved from the Internet: URL:http://www.3gpp.org/ftp/Meetings_3GPP_SYNC/SA2/Docs/[retrieved on Mar. 23, 2014].

(Continued)

*Primary Examiner* — Anh Ngoc Nguyen
(74) *Attorney, Agent, or Firm* — JCIPRNET

(57) ABSTRACT

A method of performing proximity discovery for a network entity and a user equipment (UE). In one of the exemplary embodiments, this disclosure is directed to a generating method that is applicable to a network entity and includes at least but not limited to receiving a discovery request message comprising a ProSe application identifier (ID) and a UE identity, obtaining a discover code for performing the proximity discovery according to a target group of the UE identity, and transmitting a discovery response message comprising the discovery code in response to the discovery request message. The ProSe application ID indicates the target group of the UE identity.

13 Claims, 8 Drawing Sheets

(56) References Cited

OTHER PUBLICATIONS

Interdigital Communications: "Procedures for Model B Restricted Discovery (non-public safety)", 3GPP Draft; S2-143665_X330_Prose_Restricted_Model_B_Rev, Oct. 17, 2014, Retrieved from the Internet: URL:http://www.3gpp.org/ftp/tsg_sa/WG2_Arch/TSGS2_105_Sapporo/Docs/[retrieved on Oct. 17, 2014].
3rd Generation Partnership Project, Technical Specification Group Services and System Aspects, Proximity-based services (ProSe); Stage 2 (Release 12), 3GPP TS 23.303 V12.3.0, Dec. 2014.
3rd Generation Partnership Project; Technical Specification Group Core Network and Terminals; Proximity-services (ProSe) User Equipment (UE) to ProSe function protocol aspects; Stage 3 (Release 12), 3GPP TS24.334 V12.1.0, Dec. 2014.
Catt, "Restricted ProSe direct discovery on per UE granularity", SA WG2 Meeting #104, S2-142593, Jul. 7-11, 2014, Dublin, Ireland.
3GPP, "Technical Specification Group Services and System Aspects; Proximity-based services (ProSe); Stage 2 (Release 12)," 3GPP TS 23.303 V12.1.0, Jun. 2014, pp. 1-60.
3GPP, "Proximity-services (ProSe) User Equipment (UE) to Proximity-services (ProSe) Function Protocol aspects; Stage 3 (Release 12)," 3GPP TS 24.334 V1.1.0, Jul. 2014, pp. 1-59.
3GPP, "Numbering, addressing and identification (Release 12)," 3GPP TS 23.003 V12.4.0, Sep. 2014, pp. 1-90.

\* cited by examiner

METHOD OF PERFORMING PROXIMITY DISCOVERY FOR NETWORK ENTITY AND USER EQUIPMENT

CROSS REFERENCE TO RELATED APPLICATION

This application claims the priority benefit of U.S. provisional application Ser. No. 62/101,373, filed on Jan. 9, 2015. The entirety of the above-mentioned patent application is hereby incorporated by reference herein and made a part of specification.

BACKGROUND OF THE DISCLOSURE

1. Field of the Disclosure

The present disclosure generally relates to a method of performing proximity discovery for a network entity and a user equipment (UE).

2. Description of Related Art

In the field of device to device (D2D) communication which is often referred to as a Proximity-based Services (ProSe) communication, a UE typically may discover another UE and subsequently performs D2D communication with another UE with or without the assistance of a core network such as an Evolved Packet Core (EPC). The aforementioned case such as discover another UE by using direct radio signal, without assistance of core network is called "direct discovery". When a proximity discovery procedure occurs in direct discovery, an announcing UE and a monitoring UE may send discovery request to a network entity such as a ProSe function in the EPC network for announcing and monitoring the proximity discovery, respectively. The ProSe Function could be thought of as a collective logical function that implements network related actions required for ProSe. The ProSe Function may play different roles for each of the features of ProSe. Subsequently, the monitoring UE would check whether a match event occurred. An announcing UE could be a UE which announces certain information that could be used by a UE in proximity that has permission to discover. A monitoring UE could be a UE that monitors certain information of interest in proximities of announcing UEs.

There could be at least two kinds of ProSe direct discovery, namely an open discovery and a restricted discovery. The open discovery may predominate where there is no explicit permission that is needed from the UE being discovered, whereas the restricted discovery may only take place with explicit permissions from the UEs that are being discovered. For example, when a user wants to find his/her friends on a social network application, his/her device will likely perform the restricted discovery.

A direct discovery procedure may involve different types of discovery codes. A discovery filter of Discovery Response message may contain ProSe application code and ProSe application mask, and a ProSe application code of Discovery Response message or PC5 discovery message may contain ProSe application code. The ProSe application code may contain parameters not limited to public land mobile network (PLMN) ID of a ProSe function that assigned the ProSe application code and a temporary identity corresponding to the ProSe application ID name. The ProSe application code could be used by a monitoring UE for full or partial matching of PC5 Discovery messages received on PC5 interface. The ProSe application ID name could be used for identifying application related information for the ProSe-enabled UE. The ProSe application mask is a bitmask provided by the ProSe function in order to allow the monitoring UE to perform full or partial matching of PC5 Discovery messages received on the PC5 interface.

FIG. 1 shows a general call flow of a ProSe direct discovery procedure which is consistent with 3GPP TS 23.303 for example. In step S110, service authorization for ProSe direct services is performed for ProSe direct discovery. If the UE is authorized to announce, the UE would perform an announce request procedure (S130) to obtain a ProSe Application Code to be announced over the PC5 interface upon a request for announcing from upper layers. In step S131, when the UE is triggered to announce then it sends a discovery request for announcing to the ProSe Function in Home PLMN (HPLMN). In step S135, if the request is successful and is provided with ProSe Application Code then it starts announcing on PC5 interface. On the other hand, if the UE is authorised to monitor, the UE (such as an announcing UE) would perform a monitor request procedure (S150) to receive and process PC5_DISCOVERY messages upon a request for monitoring from upper layers. PC5_DISCOVERY message is transmitted from an announcing UE to a monitoring UE. In step S151, when the UE (such as a monitoring UE) is triggered to monitor, it sends a discovery request for monitoring to the ProSe Function. In step S155, if the request is successful and the UE is provided with a Discovery Filter consisting of ProSe Application Code(s) and/or ProSe Application Mask(s), the UE would start monitoring for these ProSe Application Codes on the PC5 interface. In step S170, when the monitoring UE detects that one or more ProSe Application Code(s) that match the discovery filter, the UE would send a match report including the ProSe Application Code(s) to the ProSe Function. There is a match event when, for any of the ProSe Application masks in a Discovery Filter, the output of a bitwise AND operation between the ProSe Application Code contained in the PC5_DISCOVERY message and this ProSe Application mask matches the output of a bitwise AND operation between the ProSe Application mask and the ProSe Application Code in the same discovery filter.

However, the aforementioned ProSe direct discovery procedure does not describe how the restricted discovery functions in detail as the discovery codes assigned for the restricted discovery is not described. The assignment of the discovery codes would be very important for the restricted discovery because only the target UEs that an announcing UE wants to discover would achieve the match event. Accordingly, there would be need to provide a method for assigning those discovery codes for the restricted discovery and a restricted discovery procedure.

SUMMARY OF THE DISCLOSURE

Accordingly, the present disclosure is directed to a method of performing proximity discovery for a network entity and a UE.

In one of the exemplary embodiments, the present disclosure is directed to a method of performing proximity discovery which is used by a network entity and the method may include not limited to receiving a discovery request message comprising a ProSe application identifier (ID) and a UE identity, obtaining a discover code for performing the proximity discovery according to a target group of the UE identity, and transmitting a discovery response message comprising the discovery code in response to receiving the discovery request message. The ProSe application ID indicates the target group of the UE identity.

In one of the exemplary embodiments, the present disclosure is directed to a method of performing proximity discovery which is used by a UE and the method may include not limited to transmitting a first PC5 DISCOVERY message comprising a first ProSe application code for a restricted discovery over a PC5 interface, wherein the PC5 interface is connected between the UE and another UE, receiving a PC5 discovery response message over the PC5 interface in response to the first PC5 DISCOVERY message, and determining whether a target-match event occurs according to the PC5 discovery response message.

In one of the exemplary embodiments, the present disclosure is directed to a method of performing proximity discovery which is used by a UE and the method may include not limited to receiving a first PC5 DISCOVERY message of an announcing UE comprising a first ProSe application code for a restricted discovery over a PC5 interface, wherein the PC5 interface is connected between the UE and another UE, and transmitting a PC5 discovery response message corresponding to the announcing UE over the PC5 interface in response to receiving the first PC5 DISCOVERY message.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
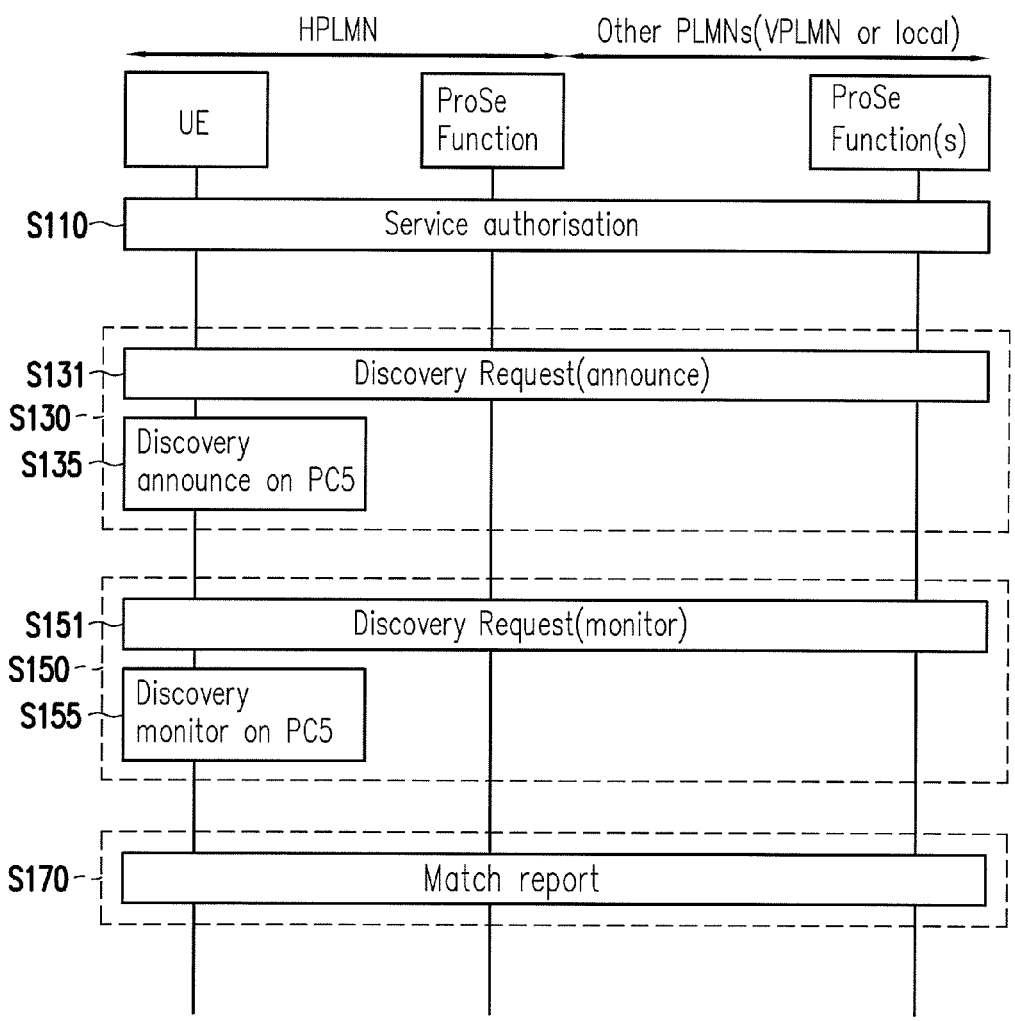
FIG. 1 shows a general call flow of a ProSe direct discovery procedure.

Reference will now be made in detail to the present preferred embodiments of the disclosure, examples of which are illustrated in the accompanying drawings. Wherever possible, the same reference numbers are used in the drawings and the description to refer to the same or like parts.

The present disclosure would provide signalling message flows for restricted direct discovery and an assignment method of discovery codes such as a ProSe application code and a discovery filter. The proposed signalling message flows would be compatible with a standard of D2D discovery procedure such as a proximity direct discovery procedure described at least in 3GPP TS 23.303 and TS 24.334 which are incorporated by reference herein. On the other hand, the proposed method to handle the assignment of discovery code according to a ProSe application ID and an UE identity would achieve the requirement of both open and restricted discoveries. The ProSe application ID would indicate a target group of announcing UEs or monitoring UEs, an open discovery, or a restricted discovery. Reference will now be made to the present preferred embodiments of the disclosure, and it will be apparent to those skilled in the art that adjustments and applications can be correspondingly made to the following embodiments based on demands instead of being limited by the content in the following description.

Figure 2:
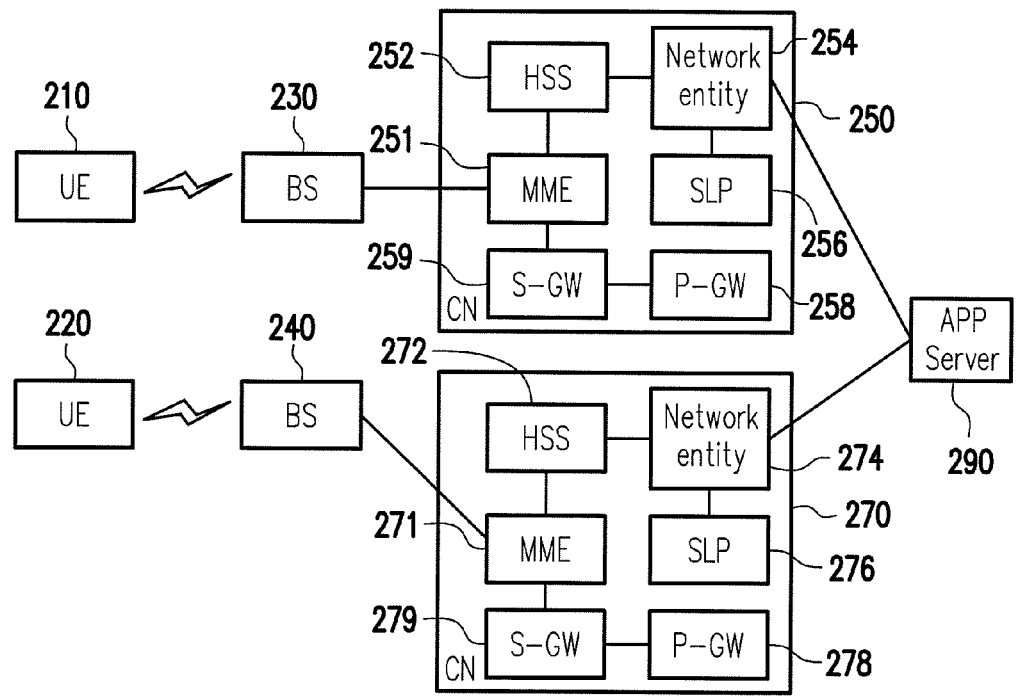
FIG. 2 is a schematic diagram illustrating a communication system in accordance with an embodiment of the present disclosure.

FIG. 2 is a schematic diagram illustrating a communication system in accordance with an embodiment of the present disclosure. Referring to FIG. 2, the communication system 200 could include but not limited to UEs 210 and 220, base stations (BSs) 230 and 240, core networks (CNs) 250 and 270, and a APP server 290.

The term "user equipment" (UE) such as UEs 210 and 220 in this disclosure could represent various embodiments which for example could include but not limited to a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and so like. In some applications, a UE may be a fixed computer device operating in a mobile environment, such as a bus, train, an airplane, a boat, a car, and so forth.

Figure 3:
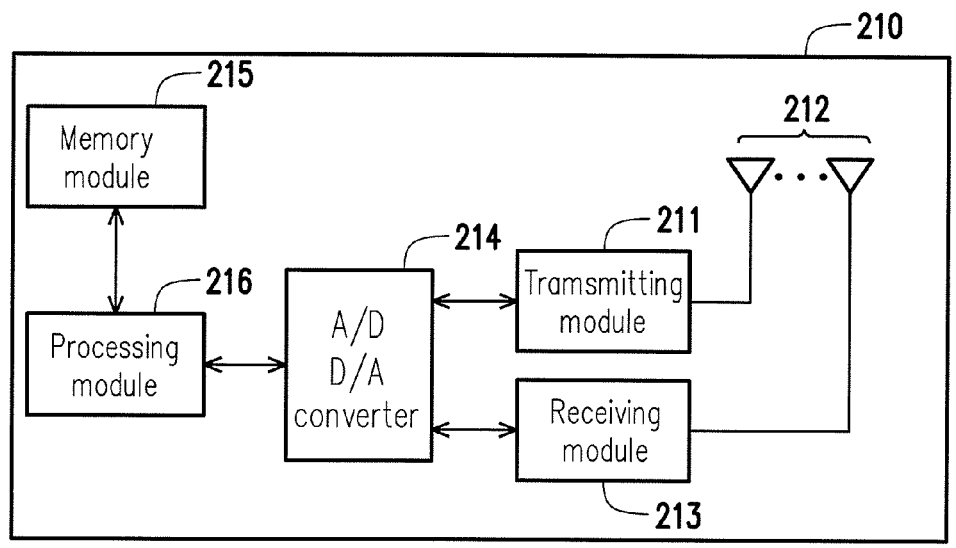
FIG. 3 illustrates an exemplary UE in accordance with an embodiment of the present disclosure.

A UE may be represented by at least the functional elements as illustrated in FIG. 3 in accordance with an embodiment of the present disclosure. UE 210 may contain at least but not limited to a transmitting module 211, a receiving module 213, an analog-to-digital (A/D)/digital-to-analog (D/A) converter 214, a processing module 216, optionally a memory module 215, and one or more antenna units 212. The transmitting module 211 transmits downlink signals wirelessly, and the receiving module 213 receives uplink signals wirelessly. The transmitting module 211 and the receiving module 213 may also perform operations such as low noise amplifying, impedance matching, frequency mixing, up or down frequency conversion, filtering, amplifying, and so like. The (A/D)/(D/A) converter 214 is configured to convert from an analog signal format to a digital signal format during uplink signal processing and from a digital signal format to an analog signal format during downlink signal processing. The processing module 216 is configured to process digital signal and to perform procedures of the proposed proximity discovery method described in the following in accordance with exemplary embodiments of the present disclosure. Also, the processing module 216 may optionally be coupled to a non-transitory memory module 215 to store programming codes, device configurations, a codebook, buffered or permanent data, discovery codes such as ProSe application codes and discovery filters, ProSe application ID, and so forth. The functions of the processing module 216 could be implemented by using programmable units such as a micro-processor, a micro-controller, a DSP chips, FPGA, etc. The functions of the processing module 216 may also be implemented with separate electronic devices or ICs, and the functions performed by the processing module 216 may be implemented within the domain of either hardware or software.

UE 220 may contain not limited to a transmitting module 221, a receiving module 223, an A/D/D/A converter 224, a processing module 226, optionally a memory module 225, and one or more antenna units 222 (not shown). The UE 220 may have a similar or the same functional elements of the UE 210, and therefore detailed descriptions for each element will not be repeated.

The term "base station" (BS) such as the BS 230 and 240 in this disclosure could represent various embodiments which for example could include but not limited to a Home Evolved Node B (HeNB), an eNB, an advanced base station (ABS), a base transceiver system (BTS), an access point, a home base station, a relay station, a scatterer, a repeater, an intermediate node, an intermediary, and/or satellite-based communications base stations.

The CNs 250 and 270 may be, for example, the, 2G CN such as GPRS core network, 3G CN, or 4G CN such as Evolved Packet Core (EPC). The CN 250 may contain at least but not limited to a mobility management entity (MME) 251, a Home Subscriber Server (HSS) 252, a network entity 254, a Secured User Plane Location Platform (SLP) 256, a Packet Data Network Gateway (P-GW) 258, and a Serving Gateway (S-GW) 259. The MME 251 is connected with the BS 230, the HSS 252, and the S-GW 259. The S-GW 259 is connected with the MME 251 and the P-GW 258. The network entity 254 is connected with the HSS 252, the SLP 256, and the APP server 290. Similarly, The CN 270 may contain at least but not limited to a MME 271, a HSS 272, a network entity 274, a SLP 276, a P-GW 278, and a S-GW 279. The coupling relation among the MME 271, the HSS 272, the network entity 274, the SLP 276, the P-GW 278, and the S-GW 279 could be referred to the coupling relation among the MME 251, the HSS 252, the network entity 254, the SLP 256, the P-GW 258, and the S-GW 259, and therefore detailed descriptions for each element will not be repeated.

Figure 4:
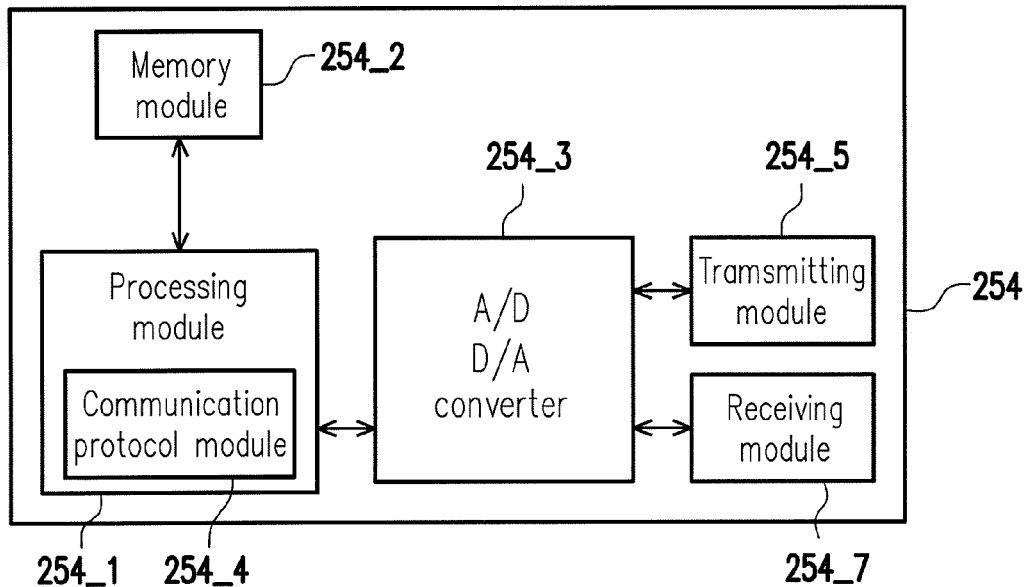
FIG. 4 illustrates an exemplary network entity in accordance with an embodiment of the present disclosure.

The exemplary network entities 254 and 257 could be ProSe Functions within an EPC network. The network entity 254 may be represented by at least the functional elements as illustrated in FIG. 4 in accordance with an embodiment of the present disclosure. The network entity 254 would include at least but not limited to a processing module 254_1, an A/D/D/A converter 254_3, a communication protocol module 254_4, a transmitting module 254_5, and a receiving module 254_7. The transmitting module 254_5 and the receiving module 254_7 is respectively used for transmitting and receiving modulated signals which could be wireless RF signals (through one or more antennas), optical signals, or signals sent over a cable. The transmitting module 254_5 and the receiving module 254_7 may also perform operations such as low noise amplifying, impedance matching, frequency mixing, up or down frequency conversion, filtering, amplifying, and so like.

The A/D/D/A converter 254_3 is configured to convert from an analog signal format to a digital signal format during uplink signal processing and from a digital signal format to an analog signal format during downlink signal processing. The communication protocol module 254_4 could be independent from or an inherent part of the processing module 254_1 and would convert a digital message into a format that is compatible with various interfaces such as PC2, PC3, PC4, PC4x, and so forth. Those functions performed by the communication protocol module 254_4 may be implemented within the domains of either hardware or software.

The processing module 254_1 is configured to process digital signal and to perform procedures of the proposed discovery code generating method described in the following in accordance with exemplary embodiments of the present disclosure. Also, the processing module 254_1 may optionally be coupled to a non-transitory memory module 254_2 to store programming codes, device configurations, a codebook, buffered or permanent data, ProSe application codes, ProSe application masks, discovery filters, ProSe application IDs, discovery code combination maps, discovery code combination pairs, discovery code combinations, allowed user lists, and so forth. The discovery code combination maps, the discovery code combination pairs, and discovery code combinations would be described later. The functions of the processing module 254_1 could be implemented by using programmable units such as a micro-processor, a micro-controller, a DSP chips, FPGA, etc. The functions of the processing module 254_1 may also be implemented with separate electronic devices or ICs, and functions performed by the processing module 254_1 may also be implemented within the domains of either hardware or software.

The network entity 274 may have a similar or the same functional elements of the network entity 254, and therefore detailed descriptions for each element will not be repeated. In some other embodiment of the present disclosure, the network entities 254 and 274 would be an application (APP) server, a file server, a cloud server, a third party server, etc in (or not in) the CNs 250 and 270.

The APP server 290 could be a ProSe APP server, a file server, a cloud server, etc. The APP server 290 further stores network level user IDs such as EPC ProSe User IDs (EPUIDs), ALUIDs (such as ALUIDs of the discoverees, ALUIDs of the discoverers), network entity IDs such as ProSe function ID (PFID), and lists of application permissions of users (such as a allowed user list corresponding the ProSe application ID and the UE identity).

It should be noticed that, the aforementioned communication system 200 is assumed that the UEs 210 and 220 are belonged to the different CNs such as the CNs 250 and 270, that means the UEs 210 and 220 transmit and receive data or messages through the CNs 250 and 270, respectively. In some other embodiment of the disclosure, the UEs 210 and 220 may located within a network coverage of the BS 230 (or the BS 240), and the UE 210 and 220 both transmit and receive data or messages through the CN 250 (or the CN 270).

In the following description, the embodiments of the present disclosure would be consisted of two parts. The first part of the embodiments of the present disclosure would be the proposed signalling message flows for the restricted discovery. The second part of the embodiments of the present disclosure would be proposed assignment and management methods for discovery codes such as ProSe application codes and discovery filters contained in Discovery Response message which is consistent with 3GPP TS 23.303 and TS 24.334.

Figure 5:
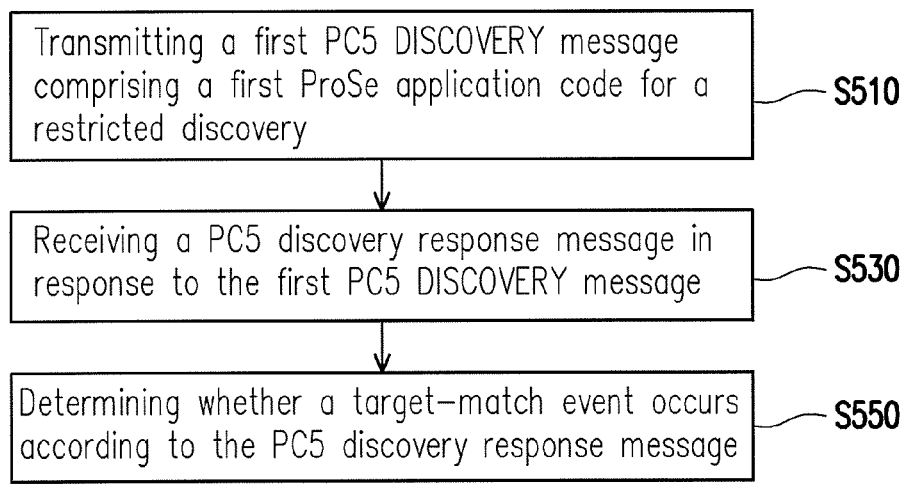
FIG. 5 is a flow chart illustrating method of performing proximity discovery for a UE in accordance with an embodiment of the present disclosure.

FIG. 5 is a flow chart illustrating method of performing proximity discovery for a UE such as UEs 210 and 220 in accordance with an embodiment of the present disclosure. For convenience, in the following description, UE 210 would be used for performing the proposed proximity discovery method. However, UE 220 may perform the same or similar procedure as UE 210, and thus a repetition of descriptions will not be repeated.

In step S510, the processing module 216 of UE 210 may transmit a first PC5 DISCOVERY message comprising a first ProSe application code for a restricted discovery over a PC5 interface through the transmitting module 211. The PC5 interface is connected between UE 210 and another UE such as UE 220.

Specifically, it is assumed that UE 210 would be an announcing UE, and UE 210 would perform a restricted discovery in order to discover some specific UE such as monitoring UEs or UE 220. For example, UE 210 wants to chat with UE 220 by a social network application. After UE 210 performs an announce request procedure with the network entity 254 or 274, UE 210 may receive the first ProSe application code contained in the Discovery Response message. Then, UE 210 may announce over the PC5 interface by transmitting the first PC5 DISCOVERY message comprising the first ProSe application code upon a request for announcing from upper layers such as an application layer. The PC5 DISCOVERY message may contain parameters not limited to ProSe application code and Message Integrity Check (MIC) associated with the ProSe application code.

It should be noticed that, PC5 interface is reference point between ProSe-enabled UEs such as UEs 210 and 220 used for control and user plane for ProSe Direct Discovery, ProSe Direct Communication and ProSe UE-to-Network Relay.

In step S530, the processing module 216 may receive a PC5 discovery response message over the PC5 interface through the receiving module 213 in response to the first PC5 DISCOVERY message. In a ProSe direct discovery procedure which is consistent with 3GPP TS 23.303 and TS 24.334 for example, after receiving the first PC5_DISCOVERY message of the UE 210, a monitoring UE such as UE 220 may check whether the first ProSe application code matches discovery filters stored in UE 220, and transmit Match Report message to the network entity 274 or 254 if the first ProSe application code matches the discovery filters. The Match Report message may contain parameters not limited to the first ProSe application code which is matched with the discovery filter and a UE ID such as International Mobile Subscriber Identity (IMSI). However, UE 210 would not directly receive response from the monitoring UE over PC5 interface in response to the PC5 DISCOVERY message. In this embodiment of the present disclosure, UE 210 would receive one or more PC5 discovery response messages from the monitoring UE over PC5 interface.

In step S550, the processing module 216 may determine whether a target-match event occurs according to the PC5 discovery response message.

Specifically, in this embodiment, if the first ProSe application code matches discovery filters stored in the monitoring UE, the monitoring UE would transmit a PC5 discovery response message to UE 210. Then, if UE 210 receives the PC5 discovery response message, the processing module 216 would determine that the target-match event occurs. That means the monitoring UE who transmits the PC5 discovery response message would be the targeted UE of UE 210 in this restricted discovery. On the other hand, if the first ProSe application code does not match discovery filters stored in the monitoring UE, one or more monitoring UE would not transmit a discovery response message to UE 210. Then, if UE 210 does not receive the PC5 discovery response message, the processing module 216 would determine that the target-match event may not occur. That means the monitoring UEs who does not transmit the discovery response message would not be the targeted UE of UE 210 in this restricted discovery.

In another embodiment of the present disclosure, the PC5 discovery response message is a second PC5 DISCOVERY message of a monitoring UE. The processing module 216 may determine the target-match event corresponding to a second ProSe application code of the second PC5 DISCOVERY message occurs in response to the second ProSe application code as being matched with the monitoring UE, and determine the target-match event corresponding to the second ProSe application code of the second PC5 DISCOVERY message does not occurs in response to the second ProSe application code as being not matched with the monitoring UE.

Specifically, in this embodiment, in response to receiving the first PC5 DISCOVERY message, the monitoring UEs would determine whether the first PC5 DISCOVERY message is in monitoring lists of the monitoring UEs. For example, the monitoring UEs may check whether public land mobile network (PLMN) ID of the first ProSe application code contained in the first PC5 DISCOVERY message is in the monitoring list. Then, the monitoring UEs may transmit the second PC5 DISCOVERY message comprising the second ProSe application code if the first PC5 DISCOVERY message is in monitoring lists of the monitoring UEs. If UE 210 receives the second PC5 DISCOVERY message, the processing module 216 would check whether the second ProSe application code is matched. For example, the processing module 216 would check whether the second ProSe application code matches one or more discovery filters stored in UE 210. If the second ProSe application code is matched, UE 210 would determine the target-match event occurs, and UE 210 may perform a match report procedure with the network entity 254 or 274 which is consistent with 3GPP TS 23.303 and TS 24.334. That means the monitoring UE who has the second ProSe application code matched in the target-match event would be the targeted UE of UE 210 in this restricted discovery. On the other hand, if the second ProSe application code is not matched, UE 210 would determine the target-match event does not occur, and UE 210 may cancel or disable the match report procedure with the network entity 254 or 274. That means the monitoring UEs who has the unmatched second ProSe application code would not be the targeted UE of UE 210 in this restricted discovery.

It should be noticed that, after receiving the second PC5 DISCOVERY message, the processing module 216 may obtain the discovery filters which have been stored in the memory module 215. In some example, the processing module 216 may further perform a monitor request procedure which is consistent with 3GPP TS 23.303 and TS 24.334, to obtain one or more discovery filters.

Figure 6:
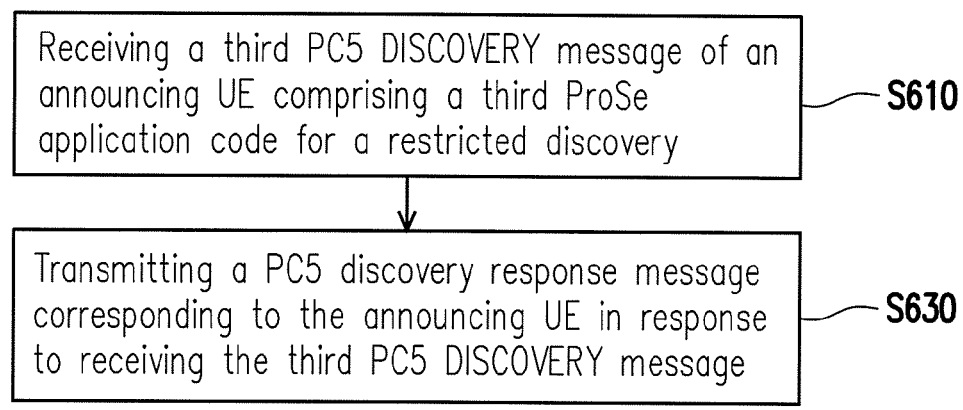
FIG. 6 is a flow chart illustrating method of performing proximity discovery for a UE in accordance with an embodiment of the present disclosure.

The aforementioned embodiment would be applied for the announcing UE. Subsequently, another proposed method of performing proximity discovery for the restricted discovery would be applied for the monitoring UE in the following description. FIG. 6 is a flow chart illustrating method of performing proximity discovery for a UE such as UEs 210 and 220 in accordance with an embodiment of the present disclosure. For convenience, in the following description, UE 220 would be used for performing the proposed proximity discovery method. However, UE 210 may perform the same or similar procedure as UE 220, and thus a repetition of descriptions will not be repeated.

In step S610, the processing module 226 of UE 220 may receive a third PC5 DISCOVERY message of an announcing UE comprising a third ProSe application code for a restricted discovery over the PC5 interface through the transmitting module 221. In this embodiment, it is assumed that UE 220 is a monitoring UE, and an announcing UE such as UE 210 would perform a restricted discovery in order to discover some specific UE such as monitoring UEs or UE 220. The further detailed description of the step S610 may be referred to the description of the step 510 of FIG. 5, and therefore detailed description will not be repeated. The PC5 interface is connected between UE 220 and another UE such as UE 210.

In step S630, the processing module 226 may transmit a PC5 discovery response message corresponding to the announcing UE over the PC5 interface through the transmitting module 221 in response to receiving the third PC5 DISCOVERY message. In one embodiment of the present disclosure, UE 220 may check whether the third ProSe application code matches stored discovery filters. Specifically, if the third ProSe application code matches the stored discovery filters, UE 220 would transmit the PC5 discovery response message indicating that the target-match event occurs. Subsequently, UE 220 may perform a match report procedure with the network entity 274 or 254 which is consistent with 3GPP TS 23.303 and TS 24.334. That means UE 220 who transmits the PC5 discovery response message would be the targeted UE of UE 210 in this restricted discovery. On the other hand, in response to the third ProSe application code not matching the stored discovery filters, UE 220 would not transmit the PC5 discovery response message. That means UE 220 who does not transmit the PC5 discovery response message would not be the targeted UE of UE 210 in this restricted discovery.

In one embodiment of the present disclosure, the PC5 discovery response message is a fourth PC5 DISCOVERY message of UE 220, and UE 220 may transmit the fourth PC5 DISCOVERY message comprising a fourth ProSe application code to UE 210 in response to receiving the third PC5 DISCOVERY message. In this embodiment, in response to receiving the third PC5 discovery message, UE 220 would determine whether the third PC5 DISCOVERY message is in monitoring lists of the monitoring UEs. For example, UE 220 may check whether the third ProSe application code contained in the third PC5 DISCOVERY message is in the monitoring list. Then, in response to the third PC5 DISCOVERY message being in monitoring lists of UE 220, UE 220 would become an announcing UE, and prepare to send announcing message such as the fourth PC5 DISCOVERY message. Subsequently, the fourth PC5 DISCOVERY message comprising the fourth ProSe application code would be transmitted over PC5 interface by UE 220.

It should be noticed that, after receiving the third PC5 DISCOVERY message, the processing module 226 may obtain the fourth application code which have been stored in the memory module 225. In some example, the processing module 226 may further perform a announce request procedure which is consistent with 3GPP TS 23.303 and TS 24.334, to obtain the fourth application code. In addition, the first, second, third and fourth PC5 DISCOVERY messages may be PC5_DISCOVERY messages which is consistent with 3GPP TS 24.334, or any PC5 Control Protocol messages. The PC5 discovery response messages may be PC5_DISCOVERY messages which is consistent with 3GPP TS 24.334, or any PC5 Control Protocol messages.

In order to help those skilled in the art to understand how the proposed methods of proximity discovery are processed in the communication system 200 according to the embodiments of the present disclosure, the following would provide two examples for different scenarios.

Figure 7:
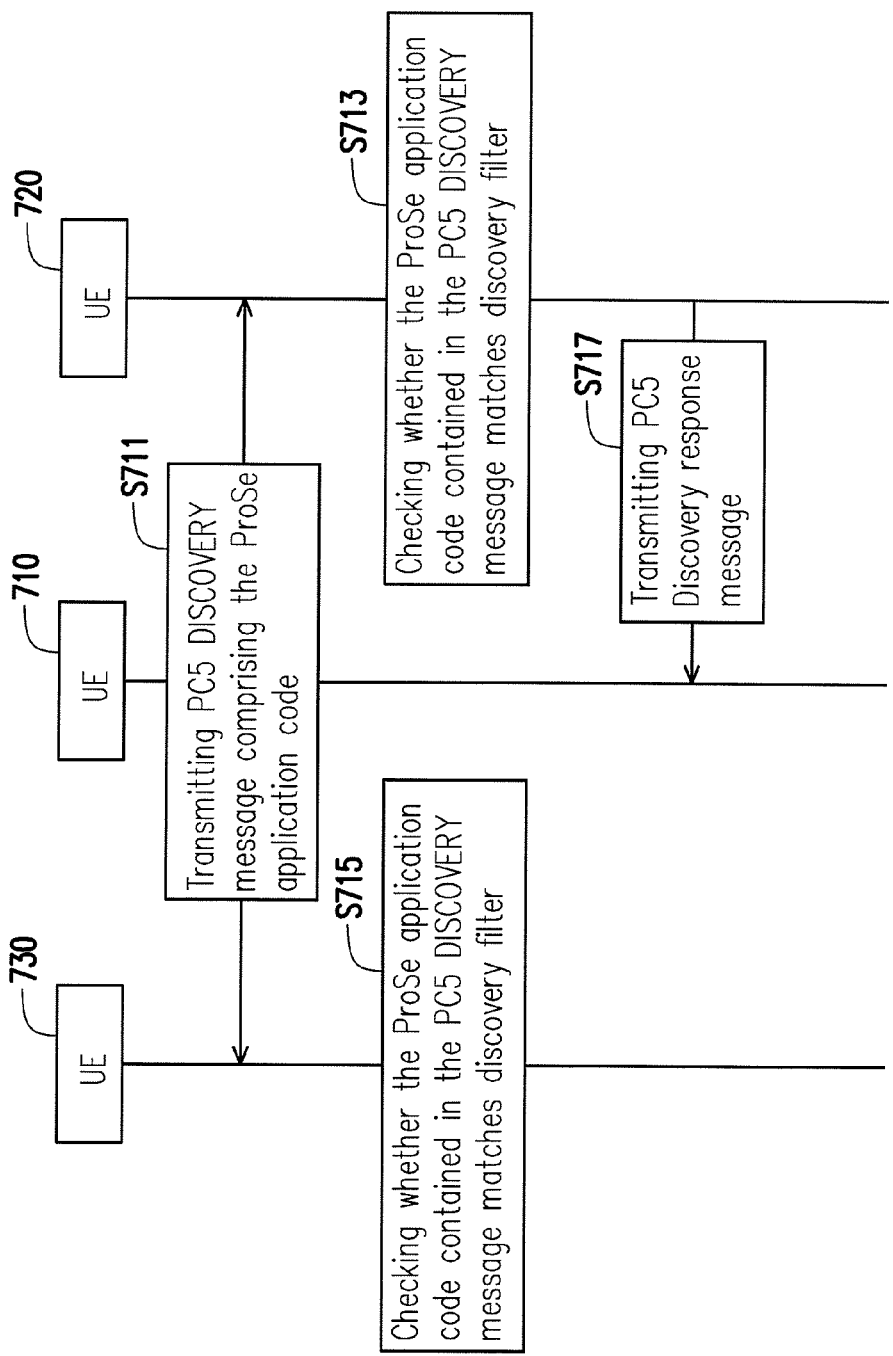
FIG. 7 illustrates a signaling diagram of a ProSe direct discovery process in accordance with one of the exemplary embodiment of the present disclosure.

In the first example, FIG. 7 illustrates a signaling diagram of a ProSe direct discovery process in accordance with one of the exemplary embodiment of the present disclosure. In this scenario, it is assumed that UE 710 is an announcing UE, and UE 720 and 730 are monitoring UEs. UE 710 and UE 720 are friends, but UE 710 and UE 730 are not friends. UE 710 would like to find its friends for chatting. In step S711, UE 710 starts announcing ProSe application code of a restricted discovery obtained from a ProSe function by transmitting PC5 DISCOVERY message comprising the ProSe application code over PC5 interface. This ProSe application code would match with UE 720 but not with UE 730. Then, UEs 720 and 730 may receive the PC5 Discovery message transmitted by UE 710. In step S713, UE 720 would check whether the ProSe application code of UE 710 contained in the PC5 DISCOVERY message matches discovery filter which obtain from the ProSe function. A match event occurs in UE 720 because the ProSe application code matches with UE 720, then UE 720 would transmit PC5 Discovery response message to UE 710 (S717). UE 710 would be noticed that its friend UE 720 is nearby and may want to chat with UE 710. On the other hand, in step S715, UE 730 would also check whether the ProSe application code contained in the PC5 DISCOVERY message matches discovery filter of UE 730 which obtain from the ProSe function. However, a match event would not occur in UE 730 because the ProSe application code does not match with UE 730, then UE 730 would not transmit PC5 Discovery response message to UE 710.

Figure 8:
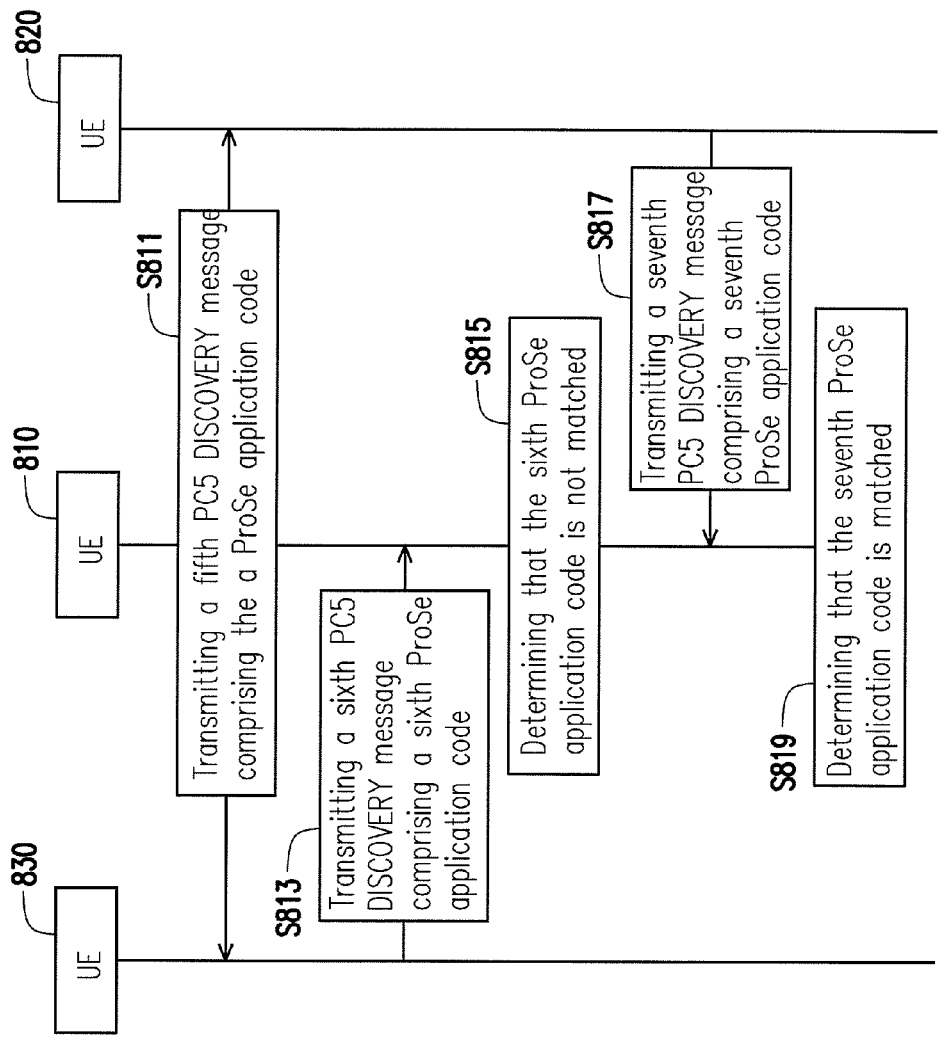
FIG. 8 illustrates a signaling diagram of a ProSe direct discovery process in accordance with one of the exemplary embodiment of the present disclosure.

In the second example, FIG. 8 illustrates a signaling diagram of a ProSe direct discovery process in accordance with one of the exemplary embodiment of the present disclosure. In this scenario, it is assumed that UE 810 and UE 820 are friends, but UE 810 and UE 830 are not friends. UE 810 would like to find its friends for chatting. In step S811, UE 810 starts announcing a fifth ProSe application code of a restricted discovery obtained from a ProSe function by transmitting a fifth PC5 DISCOVERY message comprising the fifth ProSe application code over PC5 interface. This fifth ProSe application code would in monitoring lists of UE 820 and 830. Then, UEs 820 and 830 may receive the fifth PC5 DISCOVERY message transmitted by UE 810. In step S813, UE 830 would transmit a sixth PC5 DISCOVERY message comprising a sixth ProSe application code. After receiving the sixth PC5 DISCOVERY message, UE 810 would determine that the sixth ProSe application code is not matched because UE 810 is not UE 830's target (Step S815). On the other hand, in step S817, UE 820 would transmit a seventh PC5 DISCOVERY message comprising a seventh ProSe application code. After receiving the seventh PC5 DISCOVERY message, UE 810 would determine that the seventh ProSe application code is matched because UE 820 is UE 830's target (Step S819). Then, UE 810 may perform a match report procedure with the ProSe function using the third ProSe application code.

In the aforementioned embodiments, the announcing UE would announce ProSe application code for restricted discovery, and the announced ProSe application code may only match with specific discovery filters. In the following embodiments, the proposed method for assigning and maintaining discovery codes such as ProSe application code and discovery filter of open discovery and restricted discovery would be introduced.

At first, several parameters would be defined for the following embodiments. ProSe application codes Pr and Po may contain in PC5_DISCOVERY messages for announcing. ProSe application masks Mm and Mn and ProSe application code A may contain in discovery filters. It is assumed that ProSe application code Pr may match with a discovery filter comprising ProSe application mask Mm, but may not match with another discovery filter comprising ProSe application mask Mn. And, ProSe application code Po may match with a discovery filter comprising ProSe application mask Mm, and may also match with another discovery filter comprising ProSe application mask Mn.

A discovery code combination such as a restricted announcing combination (RAC) may contain parameters not limited to a set of ProSe application code Pr, ProSe application code A, and ProSe application mask Mn. A discovery code combination pair such as a restricted announcing ProSe application pair (RAPAP) may contain parameters not limited to a set of ProSe application ID and RAC. Each ProSe application ID may correspond to different target groups. For example, ProSe application ID A indicates a family group of social network application A, ProSe application ID B indicates a classmate group of social network application B, and ProSe application IDs A and B may be different. A discovery code combination map such as a restricted announcing ProSe application map (RAPAM) may contain parameters not limited to all RAPAPs that belong to a specific announcing UE.

For example, table (1) is an example of RAPAM of UE X. RAC1 and RAC2 are corresponding to ProSe application ID ID1 and ID2, respectively.

TABLE (1)

| ProSe application ID | RAC |
|---|---|
| ID1 | RAC1 |
| ID2 | RAC2 |

It should be noticed that, the network entities 254 and 274 may store and maintain RAPAMs for all its served UEs such as UE 210 and 220. In addition, RAPAMs stored in the network entities 254 and 274 may be correspond to one or more UEs which is in an allowed user list of each monitoring UE. The allowed user list may contain UEs allowed to discover the monitoring UE such as UE 220, and each allowed user list may be corresponding to different target groups of monitoring UEs. For example, allowed user list A is corresponding to family group of UE 210, allowed user list B is corresponding to colleague group of UE 210, and allowed user list C is corresponding to classmate group of UE 210. The allowed user list may be requested by the network entity 254 or 274, to ask the APP server 290 or other third party server for the discovery policies of the monitoring UEs. The monitoring UE may configure its discovery policy on website or application through Internet. For example, UE 220 may configure that "can be discovered by family" and "can not be discovered by classmate" through installed social application F in response to receiving a setting operation of user of UE 220.

Figure 9:
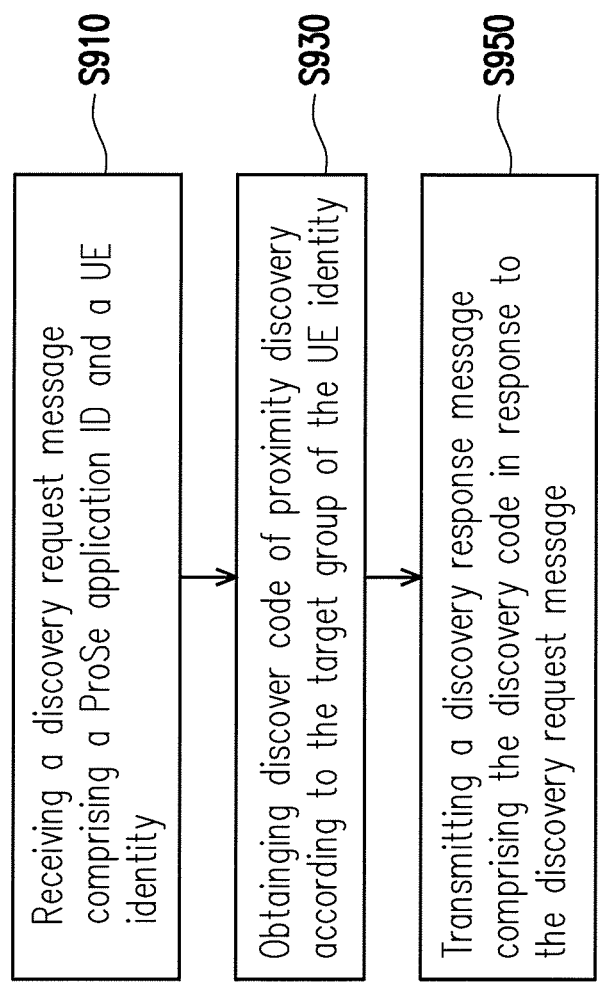
FIG. 9 is a flow chart illustrating method of performing proximity discovery for a network entity in accordance with an embodiment of the present disclosure.

FIG. 9 is a flow chart illustrating method of performing proximity discovery for a network entity such as the network entities 254 and 274 in accordance with an embodiment of the present disclosure. For convenience, in the following description, the network entity 254 would be used for performing the proposed proximity discovery method. However, the network entity 274 may perform the same or similar procedure as the network entity 254, and thus a repetition of descriptions will not be repeated. In step S910, the processing module 254_1 of the network entity 254 may receive a discovery request message comprising a ProSe application ID and a UE identity through the receiving module 254_7. The ProSe application ID indicates a target group of the UE identity.

Specifically, in an announce request procedure which is consistent with 3GPP TS 23.303 and TS 24.334, an announcing UE such as UE 210 may transmit a Discovery Request message to the network entity 254 or the network entity 274 in HPLMN. The discovery request message may contain parameters not limited to a ProSe application ID, a UE identity, an announce command, and application ID. The ProSe Application ID indicates what UE such as UE 210 is interested to announce and what target group is interested to be discovered. The UE 210 or 220 is configured with the data structure of the ProSe Application IDs corresponding to HPLMN. The UE Identity is set to e.g. International Mobile Subscriber Identity (IMSI). The IMSI is consists of a mobile country code (MCC), a mobile network code (MNC), and a Mobile Subscriber Identification Number (MSIN). The Application ID represents a unique identifier of the UE application that has triggered the transmission of the Discovery Request message.

On the other hand, in a monitor request procedure which is consistent with 3GPP TS 23.303 and TS 24.334, a monitoring UE such as UE 220 may also transmit a Discovery Request message comprising ProSe application ID, UE identity, monitor command, application ID to the network entity 274 or the network entity 254 in HPLMN. The ProSe Application ID indicate what UE such as UE 220 is interested to monitor and what target group would be allowed to discover, and the ProSe Application ID is consist a subset of the data structure of the PLMN. Then, the processing module 254_1 may receive the Discovery Request message from the announcing UE(s) or the monitoring UE(s) through the receiving module 254_7.

In step S930, the processing module 254_1 may obtain a discover code for performing the proximity discovery according to the target group of the UE identity. Specifically, the processing module 254_1 may check for the authorization of the application represented by the Application ID. If the Discovery Request is authorized, then the ProSe Function 254 would check whether UE 210 or 220 is authorized to use the ProSe Application ID contained in the Discovery Request. If UE 210 or 220 is authorised to use that ProSe Application ID, then the processing module 254_1 would prepare for one or more discovery codes contained in a Discovery Response message.

In one embodiment of the present disclosure, the discover code is a ProSe application code of an announcing UE such as UE 210, and the processing module 254_1 would obtain the ProSe application code for an open discovery or a restricted discovery according to the ProSe application ID. Specifically, the ProSe application ID may also indicate that the announcing UE would like to use the open discovery or the restricted discovery. If an announcing UE requires for the open discovery, the processing module 254_1 would assign the ProSe application codes Po to this announcing UE. One the other hand, if the announcing UE requires for the restricted discovery, the processing module 254_1 would assign the ProSe application code according to a discovery code combination of the announcing UE corresponding to the target group of the UE identity in response to obtaining the ProSe application code for the restricted discovery. The processing module 254_1 would check the discovery code combination map such as RAPAM of this announcing UE and determine whether the code combination such as RAC corresponding to the ProSe application ID is available.

Then, the processing module 254_1 may obtain the ProSe application code from the discovery code combination in response to the discovery code combination corresponding to the ProSe application ID being available. For example, the processing module 254_1 may assign ProSe application code Pr in a RAC corresponding to the ProSe application ID to UE 210. On the other hand, the processing module 254_1 may generate a first discovery code combination and assigning an eighth ProSe application code in the first discovery code combination as the ProSe application code in response to the discovery code combination corresponding to the ProSe application ID being not available. For example, the processing module 254_1 may create a new RAC of the ProSe application ID, and assign ProSe application code Pr in the created RAC to UE 210. Then, the created RAC would be updated and corresponding to ProSe application ID contained in the Discovery Request message to RAPAM of UE 210.

It should be noticed that, another information element in the Discovery Request message would also indicate whether the announcing UE want to use open or restricted discovery. For example, Discovery Type of information element which is consistent with 3GPP TS 24.334.

In one embodiment of the present disclosure, the discover code comprises one or more discovery filters of a monitoring UE, and the processing module 254_1 may assign a ProSe application code of the monitoring UE and a ProSe application mask to each discovery filter according to one or more discovery code combinations of one or more allowed users in the target group, respectively. Specifically, if the Discovery Request message is requested by a monitoring UE, the processing module 254_1 would assign discovery filter to this monitoring UE. The processing module 254_1 may obtain an allowed user list such as relationship list of the monitoring UE corresponding to the request ProSe application ID contained in the Discovery Request message.

It is assumed that allowed user list is defined as $S_{allowed}$. The allowed user list $S_{allowed}$ may comprise one or more allowed application layer user IDs, UE identities, or any identifiers of allowed users. The processing module 254_1 would obtain the discovery filter for each allowed user. For every allowed user in the allowed user list $S_{allowed}$, the processing module 254_1 may prepare a discovery filter F and start to assign ProSe application mask to each discovery filter F. Then, the processing module 254_1 may check whether a RAC of each allowed user corresponding to the request ProSe application ID is available.

The processing module 254_1 may obtain a first ProSe application code of the monitoring UE and a first ProSe application mask from a first discovery code combination of the allowed user in the discovery code combination in response to the first discovery code combination of the allowed user corresponding to the ProSe application ID being available. For example, ProSe application mask Mm and ProSe application code A in a RAC of the ProSe application ID would be added to discovery filter F.

On the other hand, the processing module 254_1 may generate a second discovery code combination of the allowed user and assigning the ProSe application code of the monitoring UE and a second ProSe application mask in the second discovery code combination in response to the first discovery code combination of the allowed user corresponding to the ProSe application ID being not available. For example, the processing module 254_1 may create a new RAC and RAPAP for an allowed user W. Then, ProSe application mask Mm and ProSe application code A in the created RAC would be added to the discovery filter F. Then, the created RAC would be updated and corresponding to ProSe application ID contained in the Discovery Request message to RAPAM of the allowed user W. Then, all discovery filters Fs would be assign to the monitoring UE.

It should be noticed that, there may have many allowed user in the allowed user list $S_{allowed}$, and each allowed user would be corresponding to one discovery filter F. This may cause too many discovery filters Fs assigned to the monitoring UE. Since one discovery filter may include more than one discovery mask, thus unnecessary discovery filter F could be removed.

In one embodiment of the present disclosure, the processing module 254_1 may merge a first discovery filter and a second discovery filter in the discovery filter in response to a ninth ProSe application code of the monitoring UE in the first discovery filter matches a third ProSe application mask and a tenth ProSe application code in the second discovery filter. Specifically, it is defined that a set of assigned discovery filters as $F_{set}$, and ProSe application mask assigned to discovery filter F as Mm1. It is assumed that the ProSe application code of announcing UE from the same restricted announcing combination (RAC) as Mm1 is Pr1. In following description, it is defined this kind of ProSe application code of announcing UE as "announcing ProSe code of discovery filter". For example, Pr1 is the announcing ProSe code of filter F.

It is assumed that ProSe application code A2 is assigned to one of the discovery filter G. A match equation would be defined as equation (1):

$$(Pr1 \& Mm1) = (A2 \& Mm1) \quad (1)$$

Where Pr1, Mm1, and A2 are bit strings with the same length such as 5, 10, 15, etc. "&" is a bitwise AND operation. ProSe application code A2 is matched with ProSe application code Pr1 and ProSe application mask Mm1 if satisfying the equation (1). On the other hand, ProSe application code A2 is not matched with ProSe application code Pr1 and ProSe application mask Mm1 if not satisfying the equation (1) (i.e. (Pr1 &Mm1) is not equal to (A2&Mm1)). Then, a discovery filter F would be removed if ProSe application mask Mm1 of the discovery filter F can satisfy the equation (1).

In response to the first ProSe application code of the monitoring UE in the first discovery filter matching the third ProSe application mask and the tenth announcing ProSe application code in the second discovery filter, the processing module 254_1 may assign the third ProSe application mask in the second discovery filter to the first discovery filter, and delete the second discovery filter. For example, ProSe application mask Mm1 of the discovery filter F would be added to discovery filter G, and this discovery filter F would be destroyed from memory module 254_2. On the other hand, in response to the ninth ProSe application code of the monitoring UE in the first discovery filter not matching the third ProSe application mask and the tenth announcing ProSe application code in the second discovery filter, the second discovery filter would be kept. For example, the discovery filter F would be kept in memory module 254_2. After checking every discovery filter G in the set of discovery filters $Fs_{et}$, if discovery filter F is still available, this discovery filter F would be added to the set of discovery filters $Fs_{et}$. Then, all discovery filters in the set of discovery filters $Fs_{et}$ would be added to Discovery Response message.

In addition, the allowed user list $S_{allowed}$ may be stored in the memory module 254_2 or obtained from APP server 290 or other third part server. In one embodiment of the present disclosure, the processing module 254_1 may transmitting a list request message comprising the ProSe application ID and an application layer user ID of the UE identity through the transmitting module 254_5 in response to receiving the discovery request message, and receiving a list response message comprising an allowed user list corresponding the ProSe application ID and the application layer user ID through the receiving module 254_7 in response to the list request message.

Specifically, the processing module 254_1 would find ALUID corresponding to UE identity contained in Discovery Request message, and transmit list request message comprising the ProSe application ID indicating the target group of the UE identity and the ALUID (or UE identity) to APP server 290 through the transmitting module 254_5. Based on the monitoring UE's discovery configuration, APP server 290 would find out all allowed users that are allowed to discover this monitoring UE, and fill all allowed users to an allowed user list $S_{allowed}$. Then, the allowed user list $S_{allowed}$ contained in the list response message would be forward to network entity 254. It should be noticed that, the list request message and list response message could be any PC2 control message.

In step S950, the processing module 254_1 may transmit a discovery response message comprising the discovery code through the transmitting module 254_5 in response to the discovery request message. In the announce request procedure which is consistent with 3GPP TS 23.303 and TS 24.334, Discovery Response message would be transmitted to the announcing UE such as UE 210. In the monitoring request procedure which is consistent with 3GPP TS 23.303 and TS 24.334, Discovery Response message would be transmitted to the monitoring UE such as UE 220. The discovery response message would comprise all discovery filters which are obtained in step S950. Accordingly, ProSe application code of the discovery code contained in PC5 Discovery message would be announced for open discovery or restricted discovery by the announcing UE, and discovery filter of the discovery code would use to check whether the match event occurs by the monitoring UE.

In order to help those skilled in the art to understand how the proposed methods of proximity discovery are processed in the communication system 200 according to the embodiments of the present disclosure, the following would provide an example.

Figure 10:
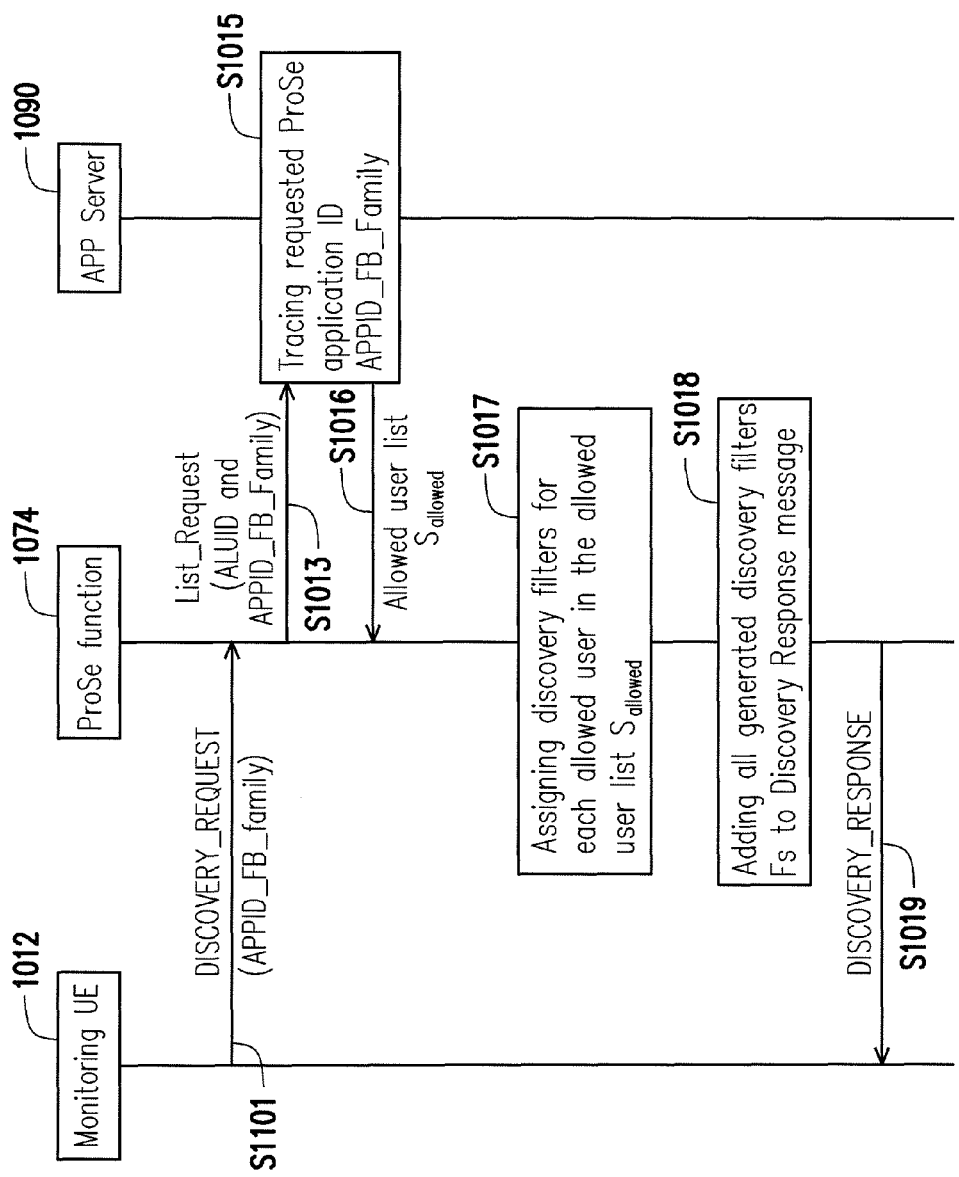
FIG. 10 illustrates a signaling diagram of a monitor request process in accordance with one of the exemplary embodiment of the present disclosure.

In the first example, FIG. 10 illustrates a signaling diagram of a monitor request process in accordance with one of the exemplary embodiment of the present disclosure. In step S1011, monitoring UE 1012 transmits a Discovery Request comprising ProSe application ID APPID_FB_Family to ProSe function 1074. ProSe function 1074 transmits list request message comprising ALUID corresponding to monitoring UE 1012 and ProSe application ID APPID_FB_Family to APP server 1090, to ask for an allowed user list $S_{allowed}$ (S1013). In step S1015, APP server 1090 would trace requested ProSe application ID APPID_FB_Family. Allowed users which are allowed to discover monitoring UE 1012 are collected in the allowed user list $S_{allowed}$. In step S1016, the allowed user list $S_{allowed}$ would be transmitted to ProSe function 1074. Then, ProSe function 1074 would assign discovery filters Fsor each allowed user in the allowed user list $S_{allowed}$ (S1017).

Table (2) is RAPAM of UE H in the allowed user list $S_{allowed}$. The requested ProSe application ID APPID_FB_Family is in the RAPAM of UE H. Then, ProSe application code A3 and ProSe application mask Mm3 in RAC3 would be add to discovery filter F of Monitoring UE.

TABLE (2)

| ProSe application ID | RAC |
|---|---|
| APPID_FB_Family | RAC3 |
| APPID_Twitter | RAC4 |

Table (3) is RAPAM of UE K in the allowed user list $S_{allowed}$. The requested ProSe application ID APPID_FB_Family is not in the RAPAM of UE K. Then, referring to table (4) which is updated RAPAM of UE K, RAC6 corresponding to ProSe application ID APPID_FB_Family would be created, and ProSe application code A6 and ProSe application mask Mm6 would in RAC6 would be add to discovery filter F of Monitoring UE.

TABLE (3)

| ProSe application ID | RAC |
|---|---|
| APPID_GTalk | RAC5 |

TABLE (4)

| ProSe application ID | RAC |
|---|---|
| APPID_GTalk | RAC5 |
| APPID_FB_Family | RAC6 |

In step S1018, all generated discovery filters Fs would be added to Discovery Response message. Part of generated discovery filters Fs may be merged. Then, the Discovery Response message comprising discovery filters Fs would be transmitted to monitoring UE 1012 (S1019).

In view of the aforementioned descriptions, the present disclosure provides a method of performing proximity discovery for a network entity and a UE. In the proposed signalling message flows for restricted discovery, an announcing UE would directly receive PC5 discovery response message in response to the PC5 discovery message over PC5 interface without negotiating with ProSe function. In addition, the aforementioned embodiments provide assignment and maintenance of discover codes such as ProSe application code of announcing UE and discovery filter of monitoring UE for open discovery and restricted discovery. The ProSe application ID would indicate target group which is interest to discover or to be discovered. The proposed method would not change the existing network structure, and would not bring much processing or management loading of ProSe function.

It should be noted that the adjectives "first", "second", "third", and so forth are simply used to distinguish one item or object from another and thus may or may not imply a sequence of events.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method of performing proximity discovery, used by a network entity, the method comprising:
   receiving a discovery request message comprising a Proximity-based Services (ProSe) application identifier (ID) and a User Equipment (UE) identity, wherein the ProSe application ID indicates a target group of the UE identity;
   obtaining a discover code for performing the proximity discovery according to the ProSe application ID by assigning a ProSe application code according to a discovery combination of an announcing UE corresponding to the target group of the UE identity in response to obtaining the ProSe application code for a restricted discovery, wherein the discover code is the ProSe application code of the announcing UE, and the discovery code combination comprises the ProSe application code of the restricted discovery, a ProSe application code of a monitoring UE, and a ProSe application mask; and
   transmitting a discovery response message comprising the discovery code in response to receiving the discovery request message.

2. The according to claim 1, wherein assigning the ProSe application code according to the discovery code combination of the announcing UE corresponding to the target group of the UE identity in response to obtaining the ProSe application code for the restricted discovery comprising:
   obtaining the ProSe application code from the discovery code combination in response to the discovery code combination corresponding to the ProSe application ID being available.

3. The according to claim 1, wherein assigning the ProSe application code according to the discovery code combination of the announcing UE corresponding to the ProSe application ID in response to obtaining the ProSe application code for the restricted discovery comprising:
   generating a first discovery code combination and assigning a first ProSe application code in the first discovery code combination as the ProSe application code in response to the discovery code combination corresponding to the ProSe application ID being not available.

4. The method according to claim 1, wherein the discover code comprises a discovery filter of the monitoring UE, and obtaining the discover code for performing the proximity discovery according to the ProSe application ID comprising:
   assigning the ProSe application code of the monitoring UE and the ProSe application mask to the discovery filter according to the discovery code combination of an allowed user in the target group, respectively.

5. The method according to claim 4, wherein assigning the ProSe application code of the monitoring UE and the ProSe application mask to the discovery filter according to the discovery code combination of the allowed user in the target group comprising:
   obtaining a first ProSe application code of the monitoring UE and a first ProSe application mask from a first discovery code combination of the allowed user in the discovery code combination in response to the first discovery code combination of the allowed user corresponding to the ProSe application ID being available.

6. The method according to claim 5, wherein assigning the ProSe application code of the monitoring UE and the ProSe application mask to the discovery filter according to the discovery code combination corresponding to the ProSe application ID comprising:
   generating a second discovery code combination of the allowed user and assigning a second ProSe application code of the monitoring UE and a second ProSe application mask in the second discovery code combination in response to the first discovery code combination of the allowed user corresponding to the ProSe application ID being not available.

7. The method according to claim 4, wherein transmitting the discovery response message comprising the discovery code in response to the discovery request message comprising:
   transmitting the discovery response message comprising all discovery filters.

8. The method according to claim 1, wherein after the step of receiving the discovery request message comprising the ProSe application ID and the UE identity, the method further comprising:
   transmitting a list request message comprising the ProSe application ID and an application layer user ID of the UE identity in response to receiving the discovery request message; and
   receiving a list response message comprising an allowed user list corresponding the ProSe application ID and the application layer user ID in response to the list request message.

9. The method according to claim 8, wherein the discover code comprises a discovery filter of the monitoring UE, the allowed user list comprises allowed application layer user IDs of allowed users, and obtaining the discover code of the proximity discovery according to the target group of the UE identity comprising:
   obtaining the discovery filter for the allowed users.

10. The method according to claim 4, wherein obtaining the discover code of the proximity discovery according to the ProSe application ID further comprising:
    merging a first discovery filter and a second discovery filter in the discovery filter in response to a second ProSe application code of the monitoring UE in the first discovery filter matches a third ProSe application mask and a third ProSe application code in the second discovery filter.

11. The method according to claim 10, wherein after the step of merging the first discovery filter and the second discovery filter in the discovery filter, the method further comprising:
assigning the third ProSe application mask in the second discovery filter to the first discovery filter; and
deleting the second discovery filter.

12. The method according to claim 11, further comprising:
determining the first announcing ProSe application code of the first discovery filter as being matched with the third ProSe application mask and the third ProSe application code in the second discovery filter in response to a first bitwise AND operation output between the third ProSe application code and the third ProSe application mask in the second discovery filter as being matched with a second bitwise AND operation output of the first announcing ProSe application code of the first discovery filter and the third ProSe application mask in the second discovery filter; and
determining the first announcing ProSe application code of the first discovery filter as being not matched with the third ProSe application mask and the third ProSe application code in the second discovery filter in response to the first bitwise AND operation output between the third ProSe application code and the third ProSe application mask in the second discovery filter as being not matched with the second bitwise AND operation output of the first announcing ProSe application code of the first discovery filter and the third ProSe application mask in the second discovery filter.

13. The method according to claim 11, wherein the network entity is one of a ProSe function and a server.

* * * * *